G. D. DUDLEY.
Broiler.

No. 161,937.

2 Sheets--Sheet 1.

Patented April 13, 1875.

Witnesses
John E. Crane
William R. Crane

Inventor.
George D. Dudley

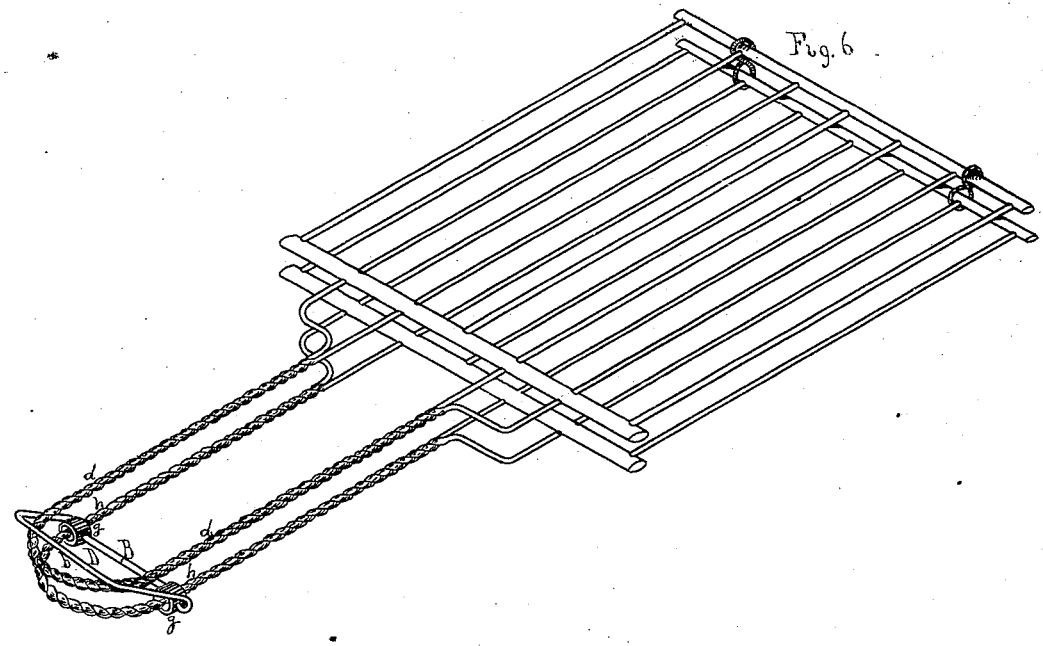

UNITED STATES PATENT OFFICE.

GEORGE D. DUDLEY, OF LOWELL, MASSACHUSETTS, ASSIGNOR TO EDWARD P. WOODS, DANIEL SHERWOOD, AND CYRUS H. LATHAM.

IMPROVEMENT IN BROILERS.

Specification forming part of Letters Patent No. 161,937, dated April 13, 1875; application filed February 26, 1875.

*To all whom it may concern:*

Be it known that I, GEORGE D. DUDLEY, of Lowell, in the county of Middlesex and State of Massachusetts, have invented a new and useful Improvement in Broilers or Toasters, of which the following is a full, clear, and exact description, reference being had to the accompanying drawings, making part of this specification, in which—

Figure 1:
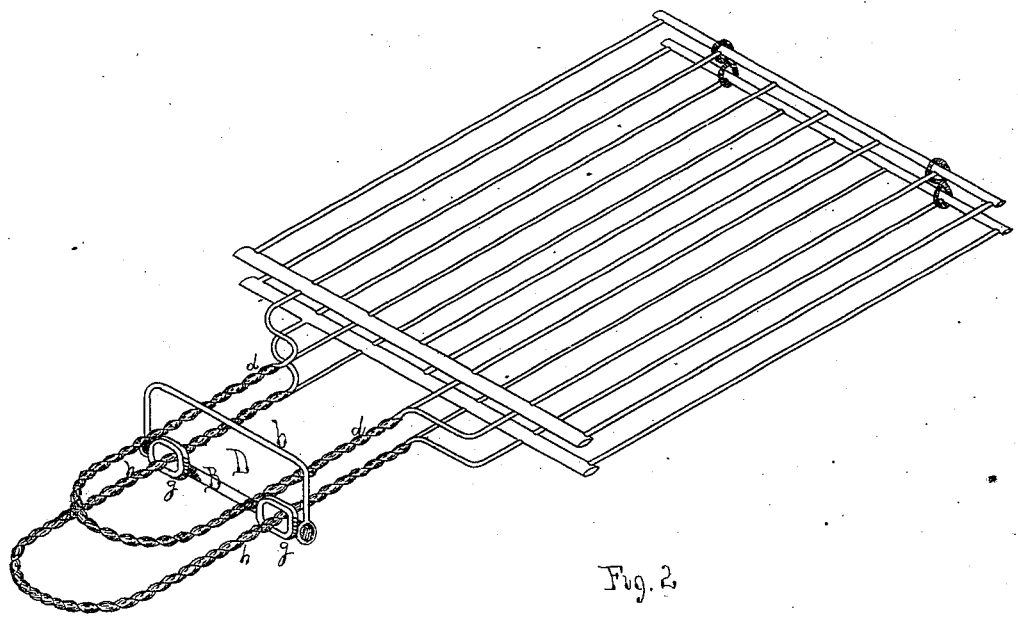
Figure 2:
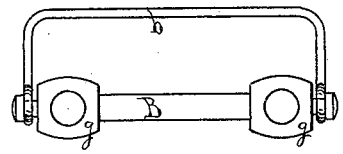
Figure 3:
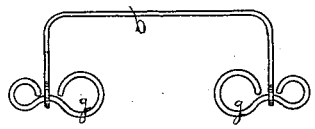
Figure 4:
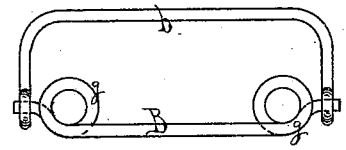
Figure 5:
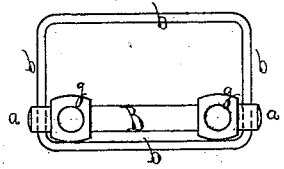

Figure 1 represents an isometrical projection of a broiler embodying my invention. Fig. 2 is a detached elevation or plan of the reversible slide, which is the novel and useful improvement in this broiler. Figs. 3, 4, and 5 are modifications of the slide referred to. Fig. 6 represents also an isometrical projection of a broiler, showing the swinging reversible slide as applied to, and made operative for securing, one or either broiler-handle to the other, when said handles are of equal length, as described.

This invention relates to an improvement in broilers or toasters, which are composed of two barred wings, connected by links and capable of being folded two ways and of holding bread or meat to be toasted or broiled.

This invention has for its object to furnish a cheap and convenient device for securing the handles of the broiler, and thereby hold the substance placed between the barred wings thereof, whichever way they are folded together.

This invention consists of a reversible slide, in combination with the handles of the broiler, the slide being constructed with two eye-furnished guides, $g$, applied to and movable on the sides $h$ of one of the handles, and having a bail or loop, $b$, attached to the outside of each guide $g$, or passing through holes in the outer end of the bar, so as to swing or slide over the end of the opposite handle $d$, and thereby secure the handles and hold the wings of the broiler together, and any substance between the wings, whichever way the broiler is folded. The guides $g$ are generally connected by a bar, B, but not of necessity, since the slide may be constructed as shown in Fig. 3 and operate successfully, the bail $b$ passing over the end of the handle $d$, as does the bail or loop shown in Figs. 1, 2, 5, and 4, the latter being constructed with the guides $g$ turned or formed by turning the eyes in the same wire of which the bar B is made, and the ends projecting to form connections for the bail.

When this reversible swinging slide is used on the handles of the broiler, both of the handles may be of the same length, as shown in the drawing, and the slide may be applied to either handle, and the bail $b$ will swing over the end of the opposite handle, whereas in the use of most other slides on the broiler-handles one handle should be longer than the other, in order to allow the slide to conveniently pass beyond the end of the shorter handle and to be slid back over it.

The slide shown in 5 is constructed with a bar, B, containing two eyes or guides, $g$, through which pass, say, the two sides $h$ of one of the broiler-handles, and the slide or its bail or loop $b$ is reversible by passing through holes in the outer ends $a$ of the bar B, and movable laterally, to create an opening for the free broiler-handle at either side of the bar by sliding the loop or slide through the holes in the ends of the bar in either direction. In this form of reversible slide the handle to which it is attached should be longer than the other.

When both of the broiler-handles are of the same length the broiler is more convenient in use, being easier held by the operator and less liable to swing open while securing the handles with the swinging reversible slides, and the latter slide is much more convenient to secure the broiler-handles of the same length.

I claim as my invention—

1. The reversible slide D, in combination with the broiler-handles, the slide being constructed with eyes or guides $g$, which are movable on one handle, and a bail, b, moving over and securing the opposite handle, substantially as described.

2. The reversible slide, in combination with the broiler-handles, and having a bar, B, connecting its guides g, substantially as described.

3. In combination with the swinging reversible slide having eyes or guides g, and a bail, b, for securing one handle to the other, as set forth, broiler-handles of equal length, substantially as described.

GEORGE D. DUDLEY.

Witnesses:
JOHN E. CRANE,
WILLIAM R. CRANE.